United States Patent
Geslin et al.

(10) Patent No.: US 9,673,870 B2
(45) Date of Patent: *Jun. 6, 2017

(54) NEAR-FIELD COMMUNICATIONS AND ROUTING

(71) Applicant: NXP B.V., Eindhoven (NL)

(72) Inventors: Jeremy Geslin, Saint Aubin sur mer (FR); Julien Marie, Iangrune sur mer (FR); Xavier Kerdreux, saint-contest (FR)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,036

(22) Filed: Feb. 1, 2016

(65) Prior Publication Data

US 2016/0149616 A1    May 26, 2016

Related U.S. Application Data

(63) Continuation of application No. 14/182,575, filed on Feb. 18, 2014, now Pat. No. 9,252,845.

(30) Foreign Application Priority Data

Mar. 5, 2013  (EP) .................................. 13290042

(51) Int. Cl.
  *H04B 5/00*  (2006.01)
  *H04W 4/00*  (2009.01)
  (Continued)

(52) U.S. Cl.
  CPC ......... *H04B 5/0062* (2013.01); *H04B 5/0031* (2013.01); *H04W 4/008* (2013.01); *H04W 12/08* (2013.01); *H04L 63/101* (2013.01)

(58) Field of Classification Search
  CPC .. H04B 5/0062; H04B 5/0037; H04B 5/0056; H04B 5/02; H04B 5/0068; H04B 5/0081;
  (Continued)

(56) References Cited

U.S. PATENT DOCUMENTS

2007/0236336 A1* 10/2007 Borcherding ........ G06K 7/0008
                                                                      340/10.34
2011/0024502 A1     2/2011 Kim et al.
  (Continued)

FOREIGN PATENT DOCUMENTS

EP         2106108 A1     9/2009
EP         2360987 A1     8/2011
WO       2012038187       3/2012

OTHER PUBLICATIONS

EMVCo; "Contactless Mobile Payment Architecture Overview, Version 1.0"; 28 pages (Jun. 2010).
  (Continued)

*Primary Examiner* — Golam Sorowar (57) ABSTRACT

Near-field communications (NFC) with NFC reader devices are facilitated. In accordance with one or more embodiments, an apparatus includes a NFC circuit that wirelessly communicates with different types of local NFC readers using an NFC protocol, a host circuit having one or more modules that communicate with one of the types of local NFC readers via the NFC circuit, and second (e.g., secure) modules that respectively communicate with a specific one of the different types of local NFC readers, also via the NFC circuit, using secure data stored within the second module. A routing circuit is responsive to an NFC communication received from a specific one of the NFC readers, by identifying one of the first and second modules that communicates with the specific one of the NFC readers, and routing
  (Continued)

NFC communications between the specific one of the NFC readers and the identified one of the modules.

18 Claims, 5 Drawing Sheets

(51) Int. Cl.
*H04W 12/08* (2009.01)
*H04L 29/06* (2006.01)

(58) Field of Classification Search
CPC ...... H04B 5/0075; H04B 5/00; H04B 5/0012;
H04B 5/0031; H04B 7/10; H04B 5/0043;
H04B 17/0085; H04B 1/525; H04B
5/0093; H04B 7/0602; H04B 7/0617;
H04W 4/008; H04W 88/02; H04W 12/00;
H04W 12/02; H04W 12/06; H04W 40/00;
H04W 4/18; H04W 52/0274; H04W
52/029
See application file for complete search history.

(56) References Cited

U.S. PATENT DOCUMENTS

| | | | | |
|---|---|---|---|---|
| 2013/0217323 | A1* | 8/2013 | Bhatia | H04B 5/0031 455/41.1 |
| 2013/0225125 | A1* | 8/2013 | Hugue | H04L 63/10 455/410 |

OTHER PUBLICATIONS

Extended European Search Report for Application No. 13290042.4 (Aug. 6, 2013).

\* cited by examiner

NEAR-FIELD COMMUNICATIONS AND ROUTING

CROSS-REFERENCE TO RELATED APPLICATIONS

This is a continuation application of U.S. patent application Ser. No. 14/182,575, filed Feb. 18, 2014 (now allowed), which claims the priority under 35 U.S.C. §119 of European patent application no. 13290042.4, filed on Mar. 5, 2013, the contents of which are incorporated by reference herein.

BACKGROUND

Aspects of various embodiments are directed to near-field communications (NFC), and to effecting such communications by routing different types of communications to specific secure components.

Wireless communication circuits are widely used in local communications for a variety of applications benefiting from the secure or otherwise protected communication of data. For instance, portable devices such as telephones, tablets and others can be used to communicate wirelessly with a variety of other communication circuits. Other types of wireless communication circuits are used to control access, or enable operation of other circuits (e.g., in vehicles). These and other implementations can be useful in a variety of manners.

One particular type of wireless communication in which the security of communicated data is important involves the contactless communication of information, such as for authentication or payment authorization. For such communications, various requirements/specifications have been implemented to define the manner in which such data is to be communicated. Mobile devices carrying out such applications may include a wireless communication circuit, such as a radio frequency (RF) interface circuit, that operates in connection with a micro controller to execute particular functions.

To facilitate secure wireless communications, applets (executable module/code) have been used within portable devices, such as within a mobile phone host, together with an RF interface. These applets are often implemented in what has been referred to as a secure element, which is a circuit-based element that carries out the functions of the applet. Such communications are often carried out using NFC, which can require a relatively short distance (e.g., 20 centimeters) between the device and a terminal with which the device communicates.

SUMMARY

While these approaches to communications are useful, their implementation has been limited in various contexts. For instance, the storage of information useful for various purposes can be difficult to achieve in a secure manner. Moreover, different types of NFC communications can employ different protocols or other communication requirements. These and other matters have presented challenges to the implementation of NFC.

Various example embodiments are directed to NFC circuits and their implementation, as well as to methods, apparatuses and systems involving NFC circuits.

According to an example embodiment, an apparatus includes a wireless communication circuit that sends/receives over-the-air communications using a message-exchange protocol having signaling, authentication, and both error detection and correction capabilities for interpreting messages sent and received via the over-the-air communications. A near-field communication (NFC) circuit wirelessly communicates with a plurality of different types of local NFC readers using an NFC protocol that is different than the message-exchange protocol. A user interface presents data to a user of the apparatus, and a first (e.g., processor-type) circuit communicates with remote transceivers via the wireless communication circuit and presents data pertaining to the local NFC readers to a user via the user interface. The first circuit also communicates with the NFC circuit to provide an authorization for communications with one of the NFC readers, in response to a user input received via the user interface. A plurality of second circuits (e.g., secure-type circuits) communicate with a specific one of the types of local NFC readers via the NFC circuit, using secure data stored within the second circuit and inaccessible to the first circuit, with different ones of the second circuits communicating with different ones of the types of NFC readers. A routing circuit is responsive to NFC communications received from a specific one of the NFC readers by identifying one of the second circuits that communicates with the specific one of the NFC readers, and routing NFC communications between the specific one of the NFC readers and the identified one of the second circuits.

Another example embodiment is directed to an apparatus having a NFC circuit, host circuit having one or more first modules, a routing circuit and a plurality of second modules. The NFC circuit wirelessly communicates with a plurality of different types of local NFC readers using an NFC protocol, and each first module in the host circuit communicates with one of the different types of local NFC readers via the NFC circuit. Each second module also communicates with a specific one of the different types of local NFC readers via the NFC circuit, and does so using secure data that is stored within the second module and inaccessible by the host circuit. Different ones of the second modules communicate with different types of the NFC readers. The routing circuit is responsive to NFC communications received from a specific one of the NFC readers by identifying one of the modules that communicates with the specific one of the NFC readers, and routing NFC communications between the specific one of the NFC readers and the identified one of the modules.

Another example embodiment is directed toward a method including communications via an NFC protocol, with an apparatus including a plurality of first modules and a host circuit having second modules. Each of the modules is operable to communicate with a specific one of a plurality of different types of local NFC readers that is different than a type of local NFC reader for which the other modules are operable to communicate with. In response to an NFC protocol communication received from a specific one of a plurality of different types of local NFC readers, one of the first and second modules that communicate with the specific one of the NFC readers is identified. In response to the identification of one of the second modules, secure data that is proprietary to the identified second module is accessed and used, while prohibiting access to the secure data by the host circuit. NFC communications are routed between the specific one of the NFC readers and the identified one of the modules via an NFC circuit, using the NFC protocol and accessed secure data stored within the accessed module (e.g., within the first modules, or that within the second modules which is inaccessible by the host circuit).

BRIEF DESCRIPTION OF DRAWINGS

Various example embodiments may be more completely understood in consideration of the following detailed description in connection with the accompanying drawings, in which.

DETAILED DESCRIPTION

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving NFC, and to NFC circuits. While not necessarily so limited, various aspects may be appreciated through a discussion of examples using this context.

Various aspects are directed to methods, apparatuses, systems and non-transitory media involving the management of multiple secure elements (e.g., components) for NFC communications with an external reader. An NFC controller routes contactless communication between an NFC antenna and one of the multiple secure elements, based upon a type of NFC reader circuit or circuit module and the related communication requirements therefor. Accordingly, various embodiments are directed to NFC controller management of several secured elements (e.g., universal integrated circuit card (UICC) proprietary secured elements) and/or providing card emulation functionalities to a host processor on a device hosting the secured elements, such as a processor in mobile telephone, laptop, tablet, media device or other circuit.

Various embodiments are directed to methods for operation with, and/or including an apparatus having a plurality of secure modules and a host circuit that also includes modules, in which each of the modules is operable to communicate with a specific one of a plurality of different types of local NFC readers (e.g., each module communicates with a specific reader type that is different than reader types that the other modules communicate with). When an NFC protocol communication is received from a specific one of a plurality of different types of local NFC readers, one of the modules that is configured and arranged to communicate with the specific one of the NFC readers is identified. NFC communications are routed between the specific one of the NFC readers and the identified one of the modules via an NFC circuit, using the NFC protocol and secure data stored within the module. When the identified module is a secure module, secure data that is proprietary to the identified secure module is used while mitigating/prohibiting access to the secure data by the host circuit.

Such approaches may, for example, be implemented with a host circuit that wirelessly communicates over-the-air communications using a message-exchange protocol that is different than the NFC protocol. Such a message-exchange protocol may include signaling, authentication, and error detection and correction capabilities for interpreting messages sent and received via the over-the-air communications. These communications may, for example, involve Wi-Fi, cellular telephone, Bluetooth, satellite and other communications types. In some implementations, the host circuit also provides data to a user via a user interface, such as a screen on a mobile telephone. User inputs can be provided and used to authorize communications from the modules, such as to authorize the communication of proprietary data (e.g., payment data).

In accordance with a more particular embodiment, an apparatus includes an over-the air (e.g., cellular/Wi-Fi) communication circuit, a NFC communication circuit, a user interface, a host processor, a plurality of secure modules, and a routing circuit. The over-the-air communications circuit uses a first message-exchange protocol (e.g., incompatible with the NFC protocol) having signaling, authentication, and error detection and correction capabilities for interpreting messages sent and received via the over-the-air communications. The NFC circuit wirelessly communicates with a plurality of different types of local NFC readers using an NFC protocol that is different than the first message-exchange protocol. Such NFC communications involve short-range communications, such as a few centimeters (e.g., about 10 centimeters). The host processor communicates with remote transceivers via the wireless communication circuit, presents data pertaining to the local NFC readers to a user via the user interface, and communicates with the NFC circuit to provide authorization for communications with one of the NFC readers, based on user input received via the user interface. Each secure module communicates with a specific one of the different types of local NFC readers via the NFC circuit, using secure data stored within the secure module and inaccessible to the host circuit. Each secure module communicates with a different one of the types of NFC readers, relative to the other secure modules. The routing circuit operates in response to an NFC communication by identifying one of the plurality of second circuits that communicates with the specific type of the NFC readers from which the NFC communication is received, and routes NFC communications between the specific one of the NFC readers and the identified one of the plurality of secure modules, such as by using a communication protocol specific to the NFC reader type. Such a protocol may, for example, identify types of data to be communicated and the manner in which the data is to be communicated, to facilitate authenticated NFC communications.

The routing circuit operates in one or more of a plurality of manners, to suit particular applications. In some embodiments, the routing circuit accesses stored data in a routing table to identify a particular one of the secure modules to communicate with, using data in the received NFC communication. In a more specific embodiment in which each of the secure modules stores at least one application data set that, when executed by the second circuit, causes the second circuit to communicate with the specific one of the local NFC readers, the routing circuit stores routing table data that includes a list of respective applications stored in the secure modules as well as location information identifying the storage location of the respective applications. In some implementations, the routing circuit stores routing table data including one or more of: data indicating whether or not an application is enabled (e.g., an application operated in the secure module), a power type to use (e.g., RF power received via the NFC circuit or internal battery power) for each application, and a priority associated with each application. Accordingly, the apparatus operates using one or more of these power types, to suit different embodiments. When another NFC communication is received from a different one of the NFC readers, the routing circuit identifies a different one of the secure modules that communicates with the different one of the NFC readers, and routes NFC communications between the different one of the NFC readers and the different one of the secure modules. In other embodiments, the routing circuit is also operable to identify an application run by the host circuit based upon data in the NFC communication, and route data between the specific one of the NFC readers and the first circuit for use by the identified application.

NFC communications as discussed herein may be effected using one or more of a variety of types of circuits. For instance, some embodiments are directed to an NFC circuit that can be inserted into one or more of a variety of devices, and communicate with circuits within the device. In certain embodiments, an apparatus as discussed herein is used with and/or includes a portable hand-held device, with the host processor also operating in and/or with the hand-held device for communicating via over-the-air communications. In such applications, the NFC circuit and the secure modules operate independently from the host circuit and prohibit access to the secure data via the host.

In the context of various example embodiments, a secure module, element or component as discussed herein involves a circuit or circuits within a device that maintain and/or generate at least some proprietary data to which access is not provided for one or more of modification and use. Such data may involve, for example, a secure code that can be used by internal circuitry within the device to facilitate communications with external circuits, or to enable the operation of certain functions within the device. In some implementations, a secure element/component as described herein includes proprietary user data such as data that is used in transaction authorization with electronic payment. In other implementations, a secure element/component as described herein includes proprietary data used by circuitry within the device to operate functions, such as an applet, for a variety of implementations.

For general information regarding contactless communications, and for specific information regarding one or more types of contactless communications (e.g., as may be effected via different types of reader modules as discussed herein), reference may be made to the Europay, MasterCard and Visa company "Contactless Mobile Payment architecture," chapter 7, Application choice; reference may also be made to the ISO/IEC 7816 standard for contact cards, and to the ISO/IEC 14443 standard for contactless cards, all of which are fully incorporated herein by reference. For example, one or more NFC routing apparatuses as described herein operates to detect a "SELECT" function in an APDU corresponding to a communication between a reader device and an NFC device having a secure element, such as to facilitate contactless communications based on the ISO14443-4 protocol (e.g., payment, transport, loyalty) by using ISO7816-4 APDUs to address applications over a contactless interface. Moreover, various embodiments are directed to NFC routing in connection with the NFC frontend integrated circuits PN544 and/or PN547 available from NXP Semiconductors of Eindhoven, The Netherlands.

Figure 1:
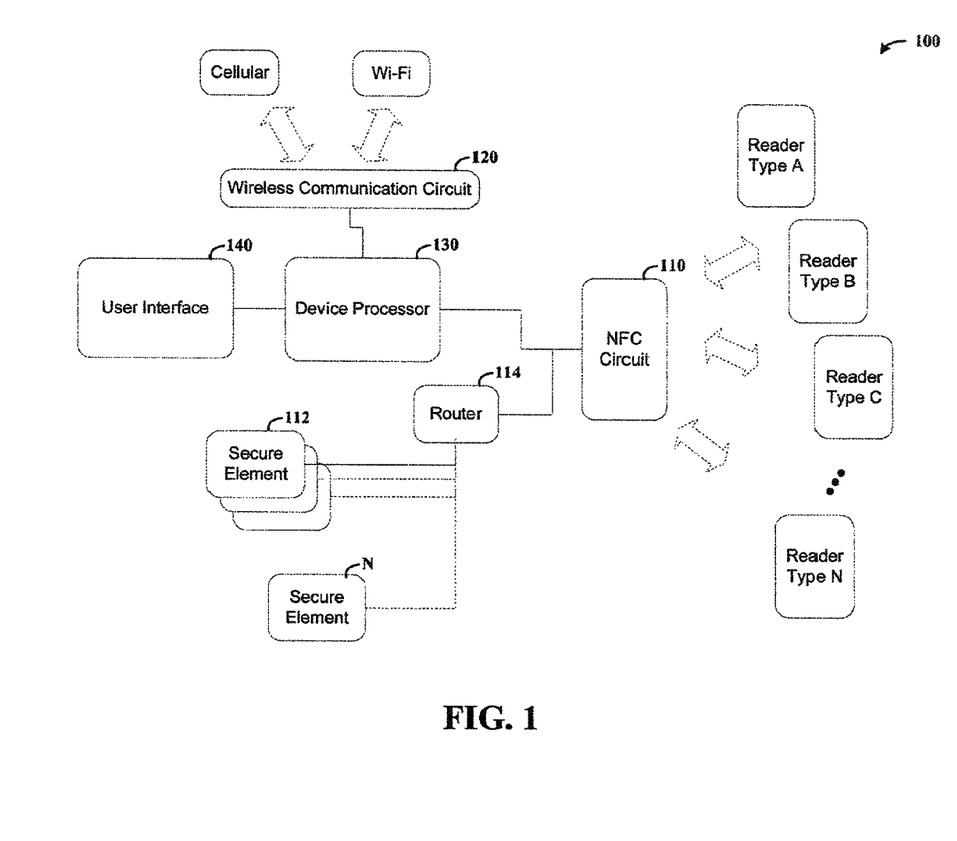
FIG. 1 shows an apparatus and approach for near-field communications (NFC) involving routing between different secure elements in an NFC device, in accordance with one or more example embodiments.

Turning now to the figures, FIG. 1 shows a NFC apparatus 100, which routes data between NFC reader devices and different secure modules, in accordance with one or more example embodiments. The apparatus 100 includes an NFC circuit 110 that communicates with a plurality of NFC reader types using NFC communications, with different types of NFC reader devices A-N shown by way of example. The apparatus 100 also includes a plurality of secure modules 112-N, and a router 114 that identifies, and routes data to, a specific one of the secure modules based upon a type of the reader devices A-N from which NFC communications are received (e.g., based on the type of data and the manner in which the data is to be communicated). The apparatus 100 is also shown including an optional wireless communication circuit 120 for over-the-air communications such as for cellular, Wi-Fi or other communication types. The apparatus 100 also includes a device/host processor 130, and a user interface 140 (which may be omitted in certain embodiments). In some implementations, the device/host processor 130 includes one or more modules that communicates with one of the different types of local NFC readers A-N via the NFC circuit 110.

The NFC communications are effected at close range (e.g., within a few centimeters) using an NFC protocol that is different than protocols used for over-the-air communications at the wireless communication circuit 120. Each secure module 112-N operates to communicate with a specific one of the reader devices, and uses stored data accessible by the secure module and inaccessible (directly) by the device/host processor 130. This stored data may, for example, be stored within each secure module, or at another portion of the apparatus 100 with access limited to the appropriate secure module. In some implementations, each secure module includes data that, when executed by the module, causes the module to communicate with the specific type of NFC reader device.

The apparatus 100 uses power from one or both of an internal battery source (e.g., implemented at 130) and RF power received via the NFC circuit 110. In some implementations, the NFC circuit 110 includes a power circuit that operates to use RF signals to generate internal power in the apparatus 100. When RF power is used, the secure modules 112-N and the router 114 may be powered for communications when the apparatus 100 is otherwise not under local (e.g., battery) power.

In some embodiments, the router 114 uses stored routing table data to identify one of the modules to which NFC communications are to be routed. In some implementations, the router 114 and/or another portion of the apparatus 100 also includes the stored routing table data.

Figure 2:
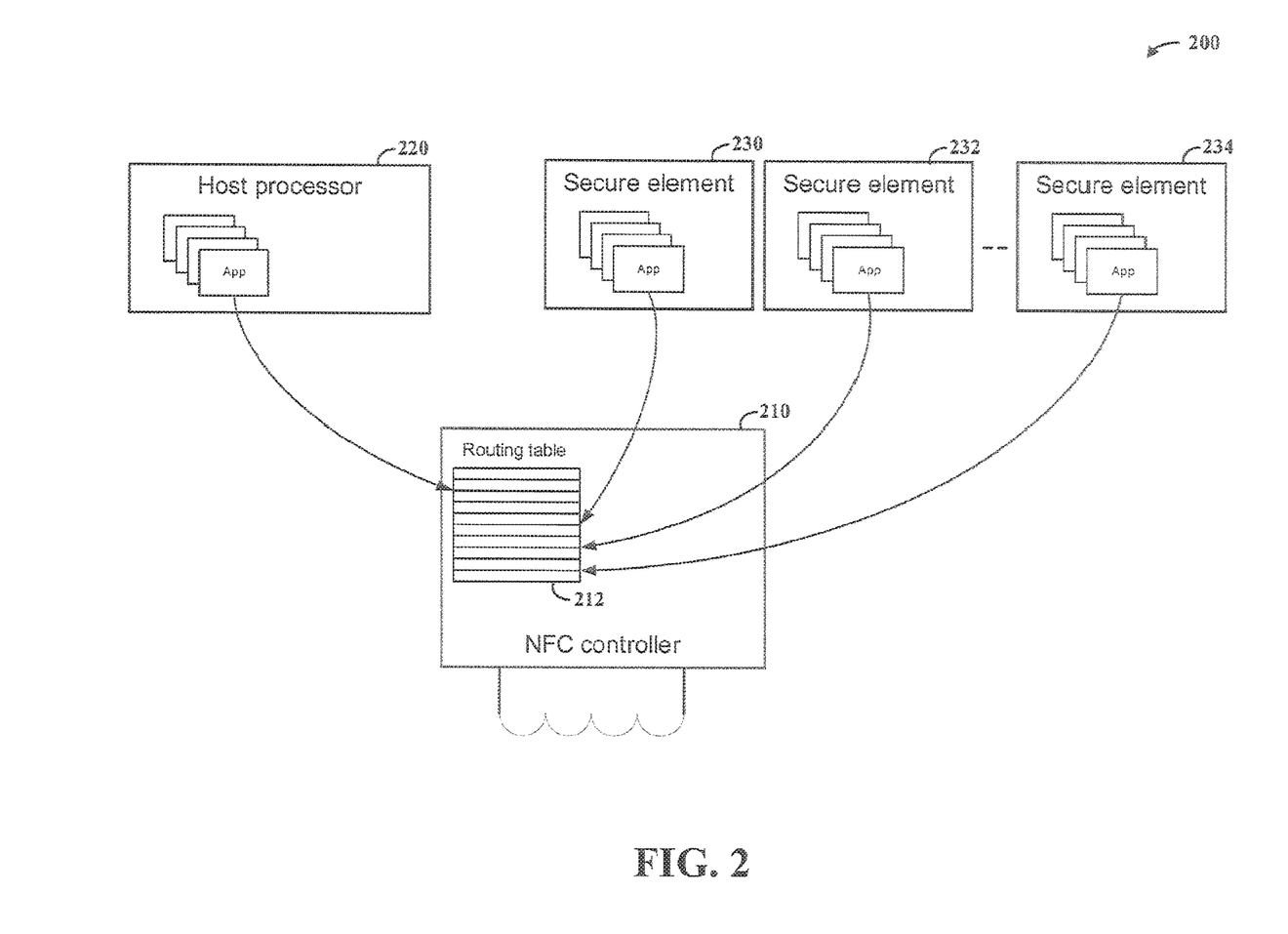
FIG. 2 shows an NFC apparatus, in accordance another example embodiment.

FIG. 2 shows an NFC apparatus 200, in accordance another example embodiment. The apparatus 200 includes an NFC controller 210, a host processor 220, and a plurality of secure elements 230, 232 and 234. The NFC controller 210 includes a routing table 212 embedded therein, and lists enabled applications located in the host processor 220 and the secure elements 230-234. These applications may, for example, include applications for effecting NFC communications with a specific local reader, such as for communicating payment data.

Each of the secure elements 230, 232 and 234 includes applications for communicating with a local reader using a specific type of communication protocol, and different from the types of communication protocols used for the other secure elements. For instance, a first protocol may specify communication procedures for effecting data communications for a payment transaction using a first payment host system, while a second protocol specifies communication procedures for effecting data communications for a payment transaction using a second payment system that is different from the first system.

The routing table 212 includes a list of all related applications present in the apparatus 200, such as an application identification (AID) value and its location (e.g., by specifying the location of an application that, when executed via its secure element, facilitate NFC communications for a specific protocol type). In certain implementations, the routing table 212 also includes one or more sets of information as follows: an indication of whether or not an application is enabled, power modes supported by each application (e.g., low power, near-field/RF power, or power via the host apparatus), and application priority.

Once the NFC controller 210 has identified a proper one of the secure elements 230, 232 and 234 (and, e.g., an application therein) to initialize secure NFC communications with a local reader device, the NFC controller forwards data between the reader and the identified secure element. In some implementations, the NFC controller 210 also identifies a proper application for communication with the host processor 220.

Figure 3A:
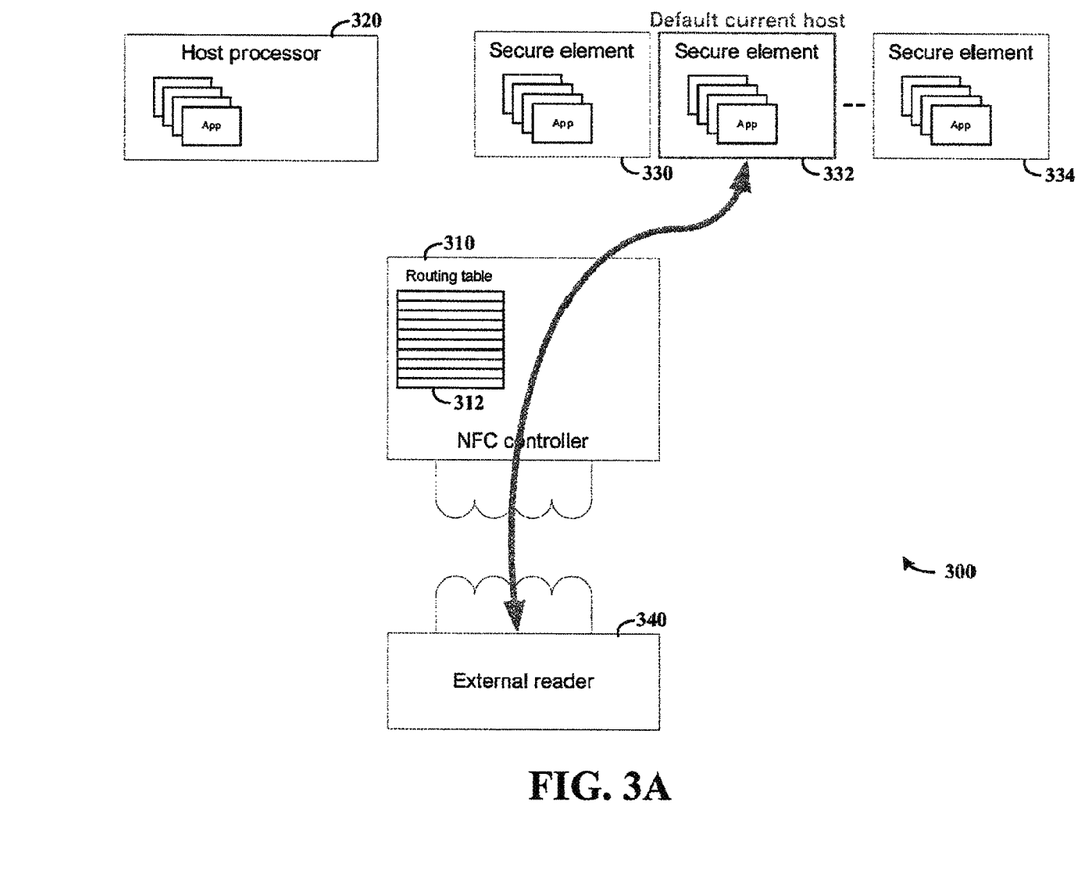
FIG. 3A shows an NFC apparatus with a first routing state, in accordance another example embodiment.
Figure 3B:
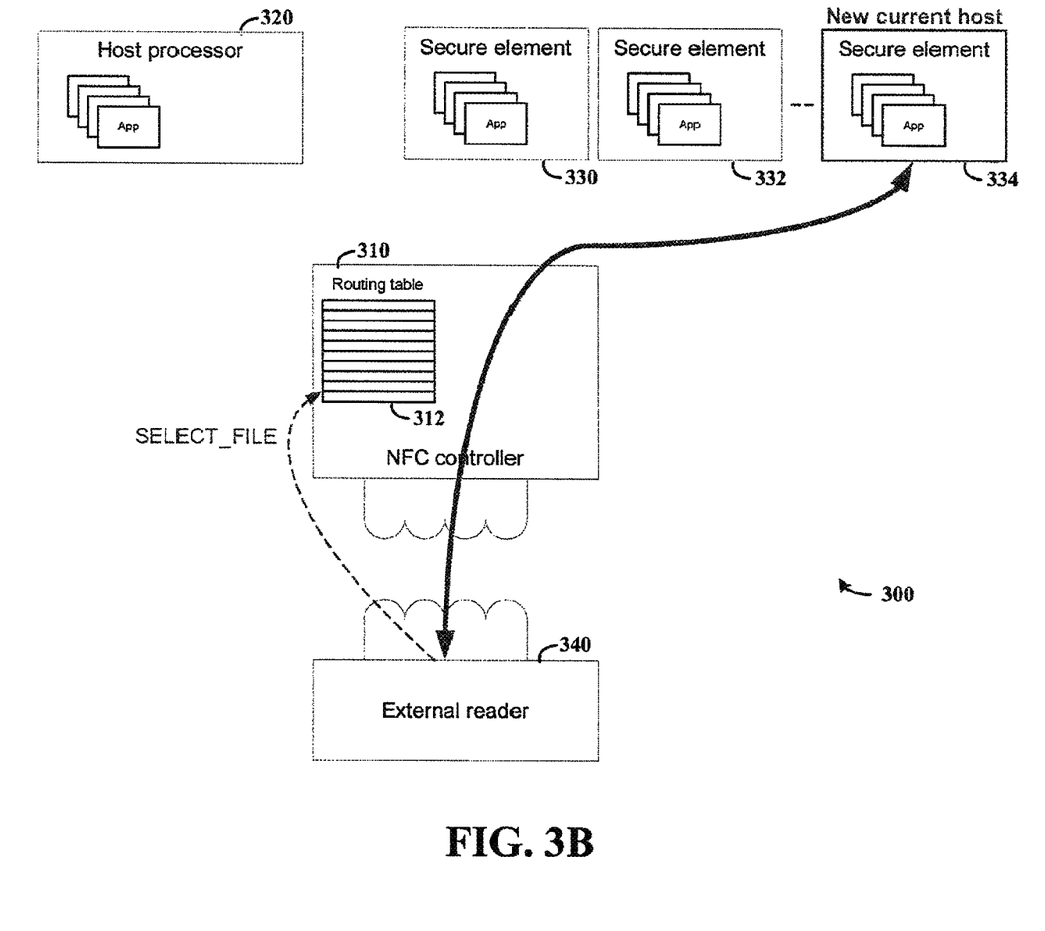
FIG. 3B shows the NFC apparatus in FIG. 3B with a second routing state, in accordance another example embodiment.

FIGS. 3A-3B show an NFC apparatus 300 with respective routing states for different current-host configurations, in accordance one or more example embodiments. The apparatus 300 may, for example, be implemented in a manner consistent with that described with the apparatus 200 in FIG. 2. In this context, the apparatus is similarly labeled with an NFC controller 310 having a routing table 312, a host processor 320, and secure elements 330, 332 and 334. FIGS. 3A and 3B also show an external reader device 340, which is part of the apparatus in certain embodiments.

Referring to FIG. 3B, the NFC controller 310 is in an operating state in which a default "current host" is selected as being secure element 332. In this state, NFC communications received and set from/to the external reader device 340. This state may involve, for example, a user's defined "default" type of communication, such as for a primary credit card or other payment protocol by which the apparatus 300 effects secure NFC communications.

Referring to FIG. 3B, the NFC controller 310 is responsive to a select file command from the external reader device 340 by accessing the routing table 312 to identify an appropriate application and its host. By way of example, the secure element 334 is identified as a new current host for effecting NFC communications, and the NFC controller 310 passes communications between the secure element 334 and the external reader device 340. For instance, when the NFC controller 310 receives an ISO7816 "SELECT FILE" command-application protocol data unit (C-APDU), it retrieves the targeted host from the routing table, which becomes the new "current host." The NFC controller 310 then forwards all incoming C-APDUs (including this first one) from the antenna to the host, and forwards response APDUs (R-APDUs) from the host to the antenna. The NFC controller 310 continues this process until it receives a new "SELECT FILE" C-APDU which is then handled as the previous one.

Figure 4:
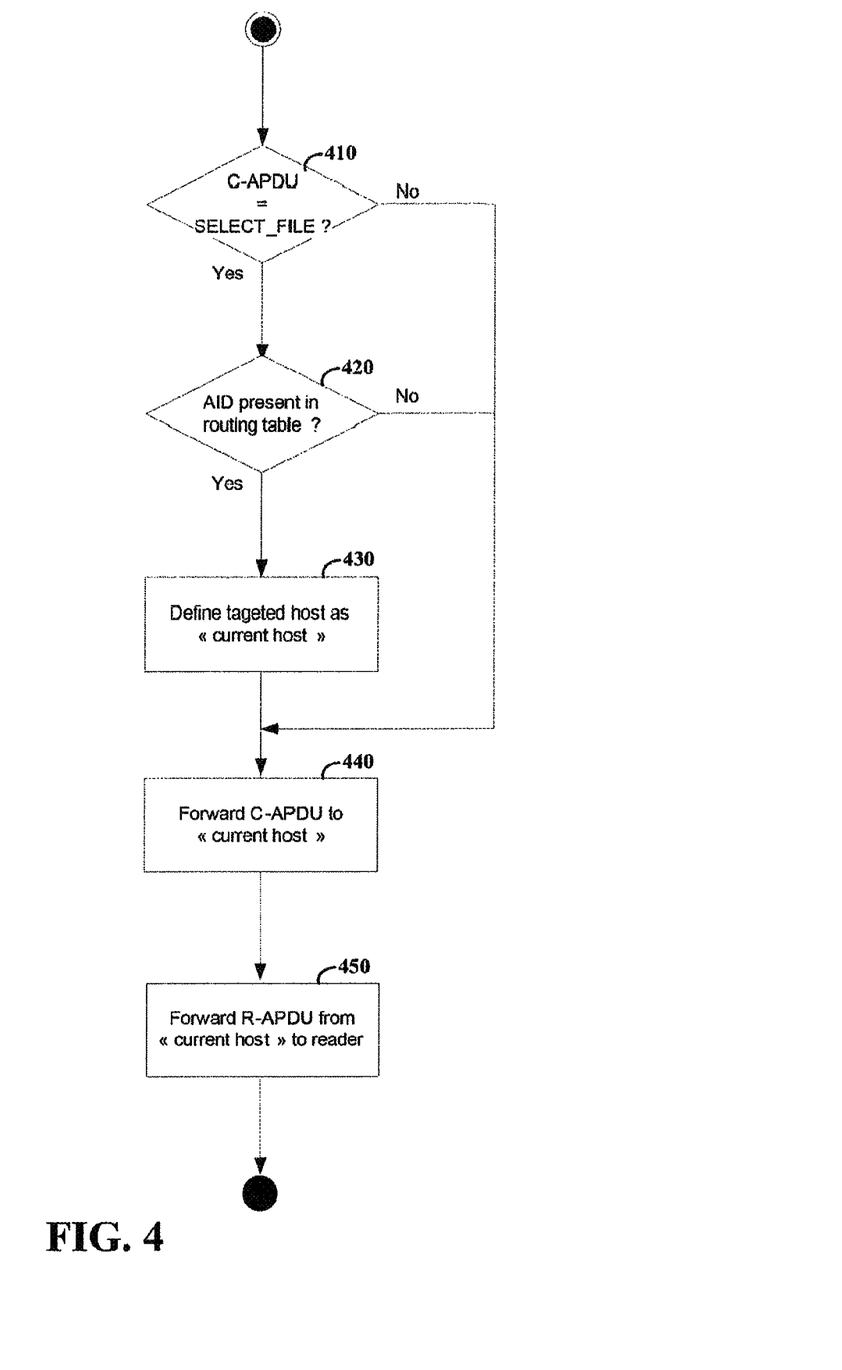
FIG. 4 shows a flow diagram for NFC communications, in accordance with another example embodiment.

FIG. 4 shows a method involving NFC communications, in accordance with another example embodiment. This approach is amenable to implementation with an NFC controller that monitors incoming communications from local reader devices, and routes data appropriately in accordance with a routing table, such as may be implemented in connection with FIGS. 3A and 3B above. For instance, an NFC controller can monitor application protocol data units (APDUs) received after an initialization (e.g., ISO14443 as discussed below).

Beginning with block 410, if a new C-ADPU command is received, a routing table is checked at block 420 to see if an appropriate AID is present in the routing table. If the AID is present, the targeted host specified via the AID is set as a current host at block 430. With this new current host established, the C-ADPU (and further communications) are forwarded to the current host at block 440. Further, responses (R-ADPU) from the current host are forwarded to the local reader device at block 450.

When a new C-ADPU command is not received at block 410, such as when operating in an initial default state, the C-ADPU and R-ADPU communications are forwarded with a current host at blocks 440 and 450. Similarly, when AID is not present in the routing table at block 420, the communications are also routed via the current host at blocks 440 and 450.

The various embodiments discussed herein are implemented with a variety of different types of devices, to effect near field communications, such as communications involving a secure element/component, for many applications. For instance, one or more embodiments are directed to implementation with NFC-capable integrated circuits with mobile devices such as laptop computers, mobile telephones, tablets, and portable music players. In some embodiments, a NFC frontend chip such as model PN544 and/or PN547 (as discussed above) is used with a secure module such as a SmartMX contact interface controller, with an integrated circuit component such as models PN65N or PN65O, all available from NXP Semiconductors of Eindhoven, The Netherlands. A host device communicates with the secure module, and the secure module executes secure functions (e.g., for communicating payment information), and can be operated such that it is not powered at all times and also communicates via RF power. Near-field communications are effected using this approach, such as for the communication of contactless ID information, for establishing network presence, or other near-field (e.g., within a few centimeters) communication. These near-field communications can also effected for operation in various power states (e.g., normal/full power, low battery mode and passive modes (e.g., powered via RF)).

Various modules may be implemented to carry out one or more of the operations and activities described herein and/or shown in the figures. In these contexts, a "module" is a circuit that carries out one or more of these or related operations/activities (e.g., validating PINs, storing ID data, storing configuration data, and others). For example, in certain of the above-discussed embodiments, one or more modules are discrete logic circuits or programmable logic circuits configured and arranged for implementing these operations/activities, as in the circuit modules shown in one or more of FIGS. 1-3B. Such modules may, for example, be implemented as part of a portable device such as a mobile telephone. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, certain modules include a combination of a CPU hardware-based circuit and a set of instructions in the form of firmware. In such an example, a first module may include a CPU hardware circuit with one set of instructions and a second module may include a second CPU hardware circuit (or the same CPU hardware circuit) with another set of instructions. Such modules may further implement circuit structures and/or functions as described in the above-referenced components available from NXP Semiconductors.

Certain embodiments are directed to a computer program product (e.g., nonvolatile memory device), which includes a machine or computer-readable medium having stored thereon instructions which may be executed by a computer (or other electronic device) to perform operations/activities as described herein.

Based upon the above discussion and illustrations, those skilled in the art will readily recognize that various modifications and changes may be made to the various embodiments without strictly following the exemplary embodiments and applications illustrated and described herein. For example, different types of host devices can be implemented with a secure component/module as discussed herein. As another example, certain embodiments are directed to an apparatus having two or more secure elements in which at least one of the secure elements operates to communicate with two or more different types of reader modules. Such modifications do not depart from the true spirit and scope of various aspects of the invention, including aspects set forth in the claims.

The invention claimed is:

1. An apparatus comprising:
a wireless communication circuit configured and arranged to send and receive over-the-air communications using a first message-exchange protocol;
a near-field communication (NFC) circuit configured and arranged to wirelessly communicate with a plurality of different types of local NFC readers using a second NFC protocol that is different than the first message-exchange protocol;
a first circuit configured and arranged to communicate with remote transceivers via the wireless communication circuit;
a plurality of second circuits, each second circuit configured and arranged to communicate with a specific one of the different types of local NFC readers via the NFC circuit, using secure data stored within the second circuit, different ones of the second circuits being configured and arranged to communicate with different ones of the types of NFC readers; and
a routing circuit configured and arranged to, in response to an NFC communication received from a specific one of the NFC readers, identify one of the plurality of second circuits that is configured and arranged to communicate with the specific one of the NFC readers, and route NFC communications between the specific one of the NFC readers and the identified one of the plurality of second circuits,
wherein the routing circuit is configured and arranged to identify the one of the plurality of second circuits by accessing stored data in a routing table,
wherein each of the second circuits stores at least one application data set that, when executed by the second circuit, causes the second circuit to communicate with the specific one of the local NFC readers, and the data stored in the routing table includes a list of respective applications stored in the respective second circuits, and location information identifying the storage location of the respective applications.

2. The apparatus of claim 1, wherein each second circuit is configured and arranged to communicate with a specific one of the different types of local NFC readers by communicating using a communication protocol specific to the NFC reader type.

3. The apparatus of claim 2, wherein each communication protocol specific to one of the NFC readers includes a protocol that identifies types of data to be communicated and the manner in which the data is to be communicated, to facilitate authenticated NFC communications.

4. The apparatus of claim 1, wherein the plurality of the second circuits includes a plurality of secure elements, each secure element stores one or more applications for communicating with a specific local reader using a specific type of communication protocol that is different from the type of communication protocol used for the other secure elements.

5. The apparatus of claim 4, wherein the secure data stored within each secure element and communicated to the specific one of the different types of local NFC readers via the NFC circuit is inaccessible to the first circuit.

6. The apparatus of claim 1, wherein the first circuit is further configured and arranged to present data pertaining to the local NFC readers to a user via a user interface, and to communicate with the NFC circuit to provide an authorization communications with one of the NFC readers in response to a user input received via the user interface.

7. The apparatus of claim 1, wherein the data stored in the routing table includes at least one of the data indicating whether or not an application is enabled, at least one of the RF power and internal battery power modes supported by each application, and a priority associated with each application.

8. The apparatus of claim 1, wherein
the wireless communication circuit is configured and arranged to send and receive over-the-air communications including at least one of: Wi-Fi communications, cellular telephone communications, Bluetooth communications, and satellite communications, and
the NFC circuit is configured and arranged with a limited communication range of less than 10 centimeters.

9. The apparatus of claim 1, wherein
the apparatus is a portable hand-held device and the first circuit is a processor that operates the portable hand-held device for communicating via over-the-air communications, and
the NFC circuit and the second circuits operate independently from the first circuit and are configured and arranged to prohibit access to the secure data via the first circuit.

10. The apparatus of claim 1, wherein the NFC circuit, the second circuits and the routing circuits are configured and arranged to operate using wireless radio frequency power received via the NFC circuit.

11. The apparatus of claim 1, wherein the routing circuit is configured and arranged to, in response to the NFC communication, identify an application run by the first circuit based upon data in the NFC communication, and route data between the specific one of the NFC readers and the first circuit for use by the identified application.

12. The apparatus of claim 1, wherein the routing circuit is configured and arranged to, in response to a second NFC communication received from a different one of the NFC readers, identify a different one of the plurality of second circuits that is configured and arranged to communicate with the different one of the NFC readers, and route NFC communications between the different one of the NFC readers and the different one of the plurality of second circuits.

13. An apparatus comprising:
- a near-field communication (NFC) circuit configured and arranged to wirelessly communicate with a plurality of different types of local NFC readers using an NFC protocol;
- a host circuit having at least one first module that is configured and arranged to communicate with one of the different types of local NFC readers via the NFC circuit;
- a plurality of secure elements, each secure element being configured and arranged to communicate with a specific one of the different types of local NFC readers via the NFC circuit using secure data that is stored within the secure element and inaccessible by the host circuit, different ones of the secure elements being configured and arranged to communicate with different types of the NFC readers; and
- a routing circuit configured and arranged to, in response to an NFC communication received from a specific one of the NFC readers, identify one of the first module and a specific secure element of the plurality of secure elements that is configured and arranged to communicate with the specific one of the NFC readers, and route NFC communications between the specific one of the NFC readers and the identified one of the first module and the specific secure element,
- characterized in that the routing circuit is configured and arranged to identify the one of the first module and the specific secure element by accessing stored data in a routing table,
- wherein each of the first module and the secure element stores at least one application data set that, when executed by the first module or the secure element, causes the first module or the secure element to communicate with the specific one of the local NFC readers, and the data stored in the routing table includes a list of respective applications stored in the respective first module and the secure element, and location information identifying the storage location of the respective application.

14. The apparatus of claim 13, wherein each secure element is configured and arranged to communicate with a specific one of the different types of local NFC readers according to a communication protocol specific to the NFC reader type.

15. The apparatus of claim 13, wherein the data stored in the routing table includes at least one of the data indicating whether or not an application is enabled, at least one of the RF power and internal battery power modes supported by each application, and a priority associated with each application.

16. The apparatus of claim 13, wherein each of the secure elements stores at least one application data set that, when executed by the secure element, causes the secure element to communicate with the specific type of the local NFC readers.

17. The apparatus of claim 13, further including a power circuit configured and arranged to provide power to the apparatus using radio frequency energy received via the NFC circuit, wherein each of the secure elements is configured and arranged to communicate with the specific one of the different types of local NFC readers using the provided power.

18. A mobile device comprising:
- a first circuit configured and arranged to communicate with remote transceivers via a wireless communication circuit;
- a near-field communication (NFC) circuit configured and arranged to communicate with a plurality of different types of local NFC readers using an NFC protocol;
- a plurality of secure elements, each secure element configured and arranged to communicate with a specific one of the different types of local NFC readers via the NFC circuit, using secure data stored within the secure element, different ones of the secure elements being configured and arranged to communicate with different ones of the types of NFC readers; and
- a routing circuit configured and arranged to, in response to an NFC communication received from a specific one of the NFC readers, identify one of the plurality of secure elements that is configured and arranged to communicate with the specific one of the NFC readers, and route NFC communications between the specific one of the NFC readers and the identified one of the plurality of secure elements,
- wherein the routing circuit is configured and arranged to identify the one of the plurality of secure elements by accessing data stored in a routing table,
- wherein each of the secure elements stores at least one application data set that, when executed by the secure element, causes the secure element to communicate with the specific one of the local NFC readers, wherein the data stored in the routing table includes a list of respective applications stored in the respective second circuits, and location information identifying the storage location of the respective applications.

* * * * *